April 30, 1935.　　　T. V. BUCKWALTER　　　1,999,891

ROLLER BEARING JOURNAL BOX CONSTRUCTION

Filed Nov. 24, 1933　　　2 Sheets-Sheet 2

INVENTOR:
Tracy V. Buckwalter

HIS ATTORNEYS

Patented Apr. 30, 1935

1,999,891

UNITED STATES PATENT OFFICE 1,999,891

ROLLER BEARING JOURNAL BOX CONSTRUCTION

Tracy V. Buckwalter, Canton, Ohio, assignor to The Timken Roller Bearing Company, Canton, Ohio, a corporation of Ohio Application November 24, 1933, Serial No. 699,517

6 Claims. (Cl. 308—180)

This invention relates principally to roller bearing journal box constructions of the kind that are split and are provided with axially spaced roller bearings. It has for its principal objects to provide a loose mounting of the outer raceway members of such bearings so as to allow said raceway members to creep and thus continually bring a new portion thereof into the load zone; to maintain a proper spacing of the outer raceway members of said bearings; and to provide additional securing bolts intermediate the ends of the journal box. Other objects are to facilitate inspection of the bearings and to provide for simplicity and cheapness of construction and compactness of design. The invention consists in the roller bearing journal box construction and in the parts and combinations and arrangements of parts hereinafter described and claimed.

Figure 1:
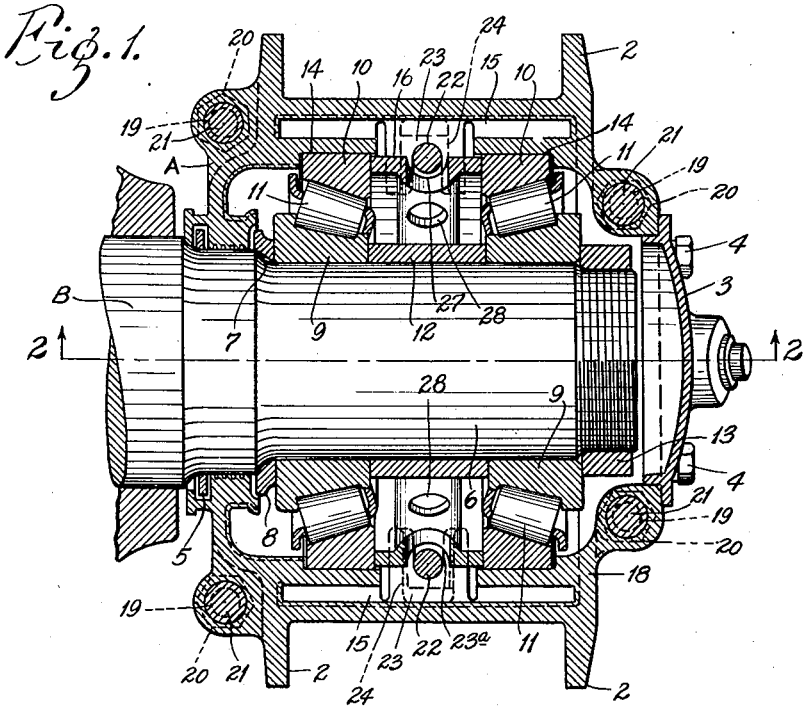
Figure 2:
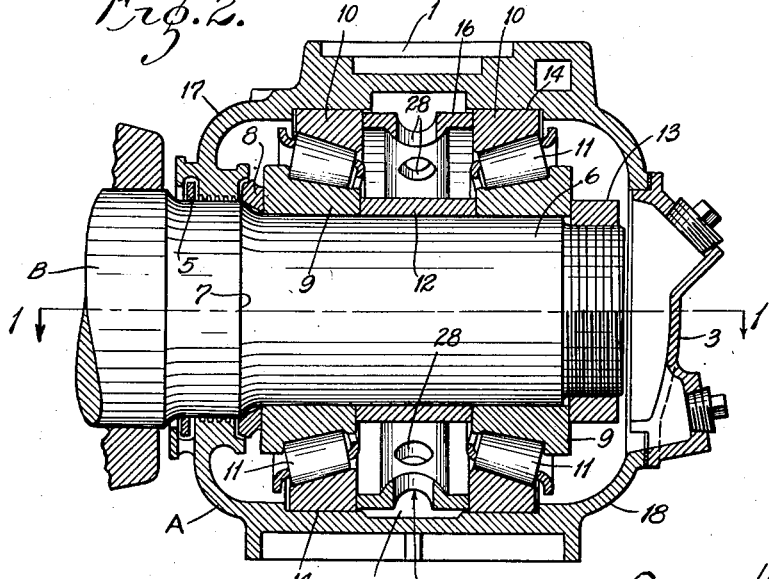
Figure 3:
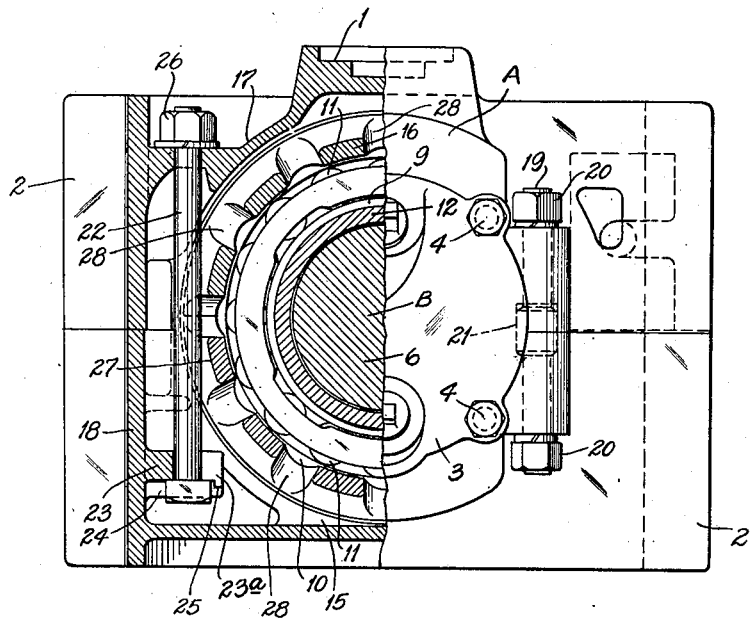
Figure 4:
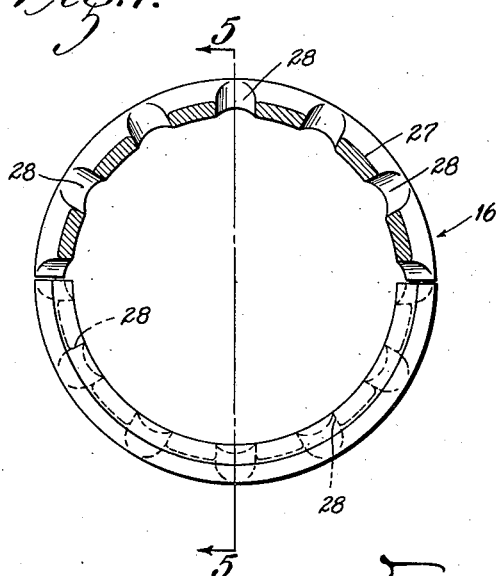
Figure 5:
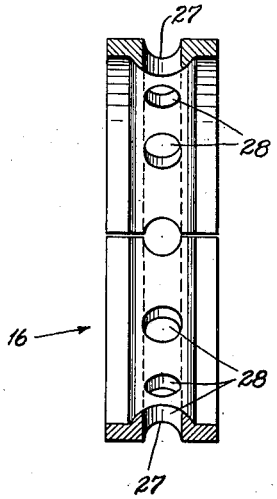

In the accompanying drawings, which form part of this specification and wherein like symbols refer to like parts wherever they occur, Fig. 1 is a horizontal section through a split roller bearing journal box construction embodying my invention, the section being taken on the line 1—1 in Fig. 2, Fig. 2 is a vertical longitudinal section on the line 2—2 in Fig. 1, Fig. 3 is a part end elevation and part vertical cross-section of the journal box, the section being taken midway of the two roller bearings, Fig. 4 is a detail view of the split cup spacer sleeve, one section thereof being shown in end elevation and the other section being shown in section; and Fig. 5 is a longitudinal section through said sleeve on the line 5—5 in Fig. 4.

In the drawings is illustrated a railway journal box comprising a lubricant containing housing A provided at its top with the usual equalizer bar seat 1, on its sides with the usual pedestal ways or guides 2 and at its outer end with an opening closed by a lid 3 secured in position by cap screws 4. A car axle B extends into the journal box housing A through an opening in the inner end thereof which is provided with a channel for receiving a suitable closure ring 5. The axle has a reduced end portion or journal 6, forming a shoulder 7 against which is mounted a suitable oil flinger ring 8.

Interposed between the journal 6 of the axle B and the journal box A are two axially spaced antifriction bearings, preferably taper roller bearings. Each of these taper roller bearings comprises a cone or inner raceway member 9 mounted on the axle, a cup or outer raceway member 10 mounted in said journal box and a series of conical bearing rollers 11 interposed between said cup and said cone. A spacer sleeve 12 is mounted on the journal 6 of the axle between the two bearing cones 9 thereon; and said spacer sleeve and said cones are held on said journal between the oil flinger 8 and a nut 13 on the end of said axle.

The cups 10 of the two roller bearings are loosely mounted in axially spaced seats 14 provided therefor in the journal box, which is provided outside of said seats with suitable lubricant chambers 15 that communicate with the space between said seats. Said cups are held in proper spaced relation by means of shoulders formed at the remote ends of the seats 14 and a split spacing sleeve 16 interposed between the opposing ends of said cups. By this arrangement, the cups 10 are loosely positioned in the journal box and, at the same time, are adapted to creep circumferentially in their seats and thus continually bring new cup surfaces into the load zone.

The journal box is split horizontally, forming an upper section 17 and a lower section 18. The two journal box sections are removably secured together adjacent to the four corners of the journal box by means of vertical through bolts 19 that extend through registering bores provided therefor in cooperating lugs formed on said sections. The corner bolts 19 are provided at their upper and lower ends with nuts 20, and have enlarged middle portions 21 that seat within counterbores in the adjacent ends of the bolt receiving bores of the upper and lower sections. The two sections of the journal box are further secured together by means of a pair of vertical bolts 22 located one on each side of the cup spacer sleeve 16 substantially midway between the spaced ends of the bearing cups 10. The lower end portion of each of these securing bolts 22 fits within an inwardly opening notch 23a provided therefor in a lug 23 that extends inwardly from the adjacent side wall of the lower journal box section 18. The head of said bolt bears against the underside of said lug and is prevented from rotating relative thereto by means of flanges 24 located on opposite sides of the notch 23a. Movement of the bolts longitudinally of the notch in the lug 23 is prevented by the closed end of the notch and by lips 25 that depend from said lug at the opposite sides of the open end of said notch. The bolt 22 extends upwardly through a hole provided therefor in the top or wall of the upper journal box section 17 and is provided with a nut 26 which bears against the top of said section and serves to draw the head of the bolt up against the underside of the lug 23. The cup spacer sleeve 16 is provided on its exterior surface with a circumferential groove 27 adapted to loosely straddle the inner sides of the intermediate securing bolts 22; and said groove is provided with a series of circumferentially spaced openings 28 which permit lubricant to pass from the chambers 15 to the space between the two roller bearings.

The hereinbefore described journal box construction has numerous advantages. It provides two additional securing bolts intermediate the ends of the journal box and inside of the pedestal ways thereof; and it provides for anchoring said bolts without the necessity for holes in the bottom of the lower journal box section. The cup spacing sleeve serves to maintain a proper spacing of the cups of the two taper roller bearings without interfering with their capacity to creep circumferentially in their seats and thus bring new portions of the cups into the load zone. The grooving of the cup spacer sleeve permits the extra pair of securing bolts to be located inside of the journal box without interfering with the rotary or axial movement of said sleeve with said cups; and the openings in said sleeve permit lubricant located outside thereof to pass through said sleeve and reach the races of the two bearings. The spliting of the cup spacer sleeve permits its removal from the axle after the removal of the journal box section; whereupon the loosely mounted cup of each bearing may be shifted endwise into the space previously occupied by said spacing sleeve and thus permit a complete inspection to be made of the cups, rollers and cones of said bearings.

Obviously, the hereinbefore described journal box construction admits of considerable modification without departing from the invention. Therefore, I do not wish to be limited to the precise construction shown and described.

What I claim is:

1. A journal box construction comprising an axle, a housing for the end thereof, spaced roller bearings interposed between said housing and said axle end, said bearings including outer raceway members loosely mounted in said journal box with their remote ends spaced therefrom, and a spacer sleeve located in said journal box between the outer raceway members of said bearings.

2. A journal box construction comprising an axle, a longitudinally split housing for the end thereof, spaced taper roller bearings on said axle end, each of said bearings including an outer raceway member loosely seated in said housing, and a spacer sleeve interposed between the outer raceway members of said bearings, spaces being provided between said housing and the remote ends of said outer raceway members.

3. A journal box construction comprising an axle, a longitudinally split housing for the end thereof, spaced taper roller bearings on said axle end, said bearings including outer raceway members loosely seated in said housing with their remote ends clear thereof, a longitudinally split spacer sleeve interposed between the outer raceway members of said bearings, and bolts extending through said housing intermediate between the ends thereof for securing the parts of said housing together adjacent to said spacer sleeve.

4. A journal box construction comprising an axle, a longitudinally split housing for the end thereof, spaced taper roller bearings on said axle end, said bearings including outer raceway members loosely seated in said housing with their remote ends clear thereof, a longitudinally split spacer sleeve interposed between the outer raceway members of said bearings, and bolts disposed transversely of said housing for securing the parts of said housing together on opposite sides of said spacer sleeve, said spacer sleeve being circumferentially grooved to accommodate said bolts.

5. A journal box construction comprising an axle, a longitudinally split housing for the end thereof, spaced taper roller bearings on said axle end, each of said bearings including an outer raceway member loosely seated in said housing, a longitudinally split spacer sleeve interposed between the outer raceway members of said bearings, said housing being provided with shoulders located opposite to and normally spaced from the remote ends of said outer raceway members, and bolts disposed transversely of said housing for securing the parts of said housing together adjacent to said spacer sleeve, said spacer sleeve being circumferentially grooved to accommodate said bolts.

6. An axle, a housing for the end thereof, spaced roller bearings on said axle end, said bearings including outer raceway members seated in said housing, and a spacer sleeve between the outer raceway members of said bearings, said outer raceway members having a light fit in said housing with their remote ends spaced therefrom.

TRACY V. BUCKWALTER.